*(12)* United States Patent
Miao et al.

(10) Patent No.: US 11,382,346 B2
(45) Date of Patent: Jul. 12, 2022

(54) BEVERAGE PRODUCT, AND SYSTEM AND METHOD FOR MANUFACTURING THE SAME

(71) Applicant: GOC INTERNATIONAL Technology CORP., Taoyuan (TW)

(72) Inventors: Jen-Chao Miao, Miaoli County (TW); Vahan Beibutian, Taipei (TW); Fu-Chen Kuo, New Taipei (TW)

(73) Assignee: GOC INTERNATIONAL Technology CORP., Taoyuan (TW)

( * ) Notice: Subject to any disclaimer, the term of this patent is extended or adjusted under 35 U.S.C. 154(b) by 259 days.

(21) Appl. No.: 16/208,462

(22) Filed: Dec. 3, 2018

(65) Prior Publication Data

US 2019/0174799 A1      Jun. 13, 2019

(30) Foreign Application Priority Data

Dec. 13, 2017   (TW) ................. 106143720

(51) Int. Cl.
    *A23L 2/54*       (2006.01)
    *A23L 2/60*       (2006.01)
    *C12G 3/04*       (2019.01)
    *B01F 23/237*     (2022.01)
    *B01F 101/16*     (2022.01)
    *A23C 9/152*      (2006.01)
    (Continued)

(52) U.S. Cl.
    CPC .............. *A23L 2/54* (2013.01); *A23C 3/005* (2013.01); *A23C 9/1524* (2013.01); *A23L 2/60* (2013.01); *B01F 23/235* (2022.01); *B01F 23/2362* (2022.01); *C12C 5/02* (2013.01); *C12C 11/11* (2013.01); *C12C 12/00* (2013.01); *C12G 1/06* (2013.01); *C12G 3/04* (2013.01); *C12H 1/14* (2013.01); *A23V 2002/00* (2013.01); *B01F 23/23764* (2022.01); *B01F 2101/14* (2022.01); *B01F 2101/16* (2022.01)

(58) Field of Classification Search
    CPC .... B01F 23/2376; B01F 2101/16; A23L 2/54; C12G 3/04
    See application file for complete search history.

(56) References Cited

U.S. PATENT DOCUMENTS 4,279,938   A  *  7/1981  Hildebrand ..........  B67D 1/1275
                                                      426/397
2002/0162458 A1*  11/2002  Farr ......................  B65D 83/32
                                                      99/279
(Continued)

FOREIGN PATENT DOCUMENTS

CN          1106325 C      4/2003
CN        106465832 A      3/2017
(Continued)

*Primary Examiner* — Katherine D Leblanc
(74) *Attorney, Agent, or Firm* — Li & Cai Intellectual Property Office

(57) ABSTRACT

A beverage product, and a system and a method for manufacturing the same are provided. The method for manufacturing a beverage product includes: (a) providing a beverage intermediate product including a container and a beverage, wherein the container has an accommodating space which is not occupied by the beverage; (b) filling a beverage foam into the accommodating space; and (c) sealing the container so that the accommodating space is sealed to obtain the beverage product.

5 Claims, 3 Drawing Sheets

Provide a beverage intermediate product including a container and a beverage, wherein the container has an accommodating space which is not occupied by the beverage — S100

Fill a beverage foam into the accommodating space — S102

Seal the container for sealing the accommodating space to obtain the beverage product — S104

(51) Int. Cl.
*C12C 11/11* (2019.01)
*C12H 1/14* (2006.01)
*C12C 5/02* (2006.01)
*A23C 3/00* (2006.01)
*C12C 12/00* (2006.01)
*C12G 1/06* (2019.01)
*B01F 23/235* (2022.01)
*B01F 23/236* (2022.01)
*B01F 101/14* (2022.01)

(56) References Cited

U.S. PATENT DOCUMENTS

| | | | | |
|---|---|---|---|---|
| 2010/0055266 | A1* | 3/2010 | Windhab | A23G 9/46 |
| | | | | 426/317 |
| 2010/0062113 | A1* | 3/2010 | Sumita | A61K 33/00 |
| | | | | 426/67 |
| 2010/0302540 | A1 | 12/2010 | Piana | |
| 2017/0080022 | A1* | 3/2017 | Levy | A61K 31/375 |

FOREIGN PATENT DOCUMENTS

| | | | |
|---|---|---|---|
| GB | 2028288 | A | 3/1980 |
| JP | 2008259480 | A | 10/2008 |
| TW | 201639791 | A | 11/2016 |
| TW | I618676 | B | 3/2018 |
| WO | WO9902406 | A1 | 1/1999 |

\* cited by examiner

BEVERAGE PRODUCT, AND SYSTEM AND METHOD FOR MANUFACTURING THE SAME

CROSS-REFERENCE TO RELATED PATENT APPLICATION

This application claims the benefit of priority to Taiwan Patent Application No. 106143720, filed on Dec. 13, 2017. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a food, and system and method for manufacturing the same, and more particularly to a beverage product, and system and method for manufacturing the same.

BACKGROUND OF THE DISCLOSURE

The method for manufacturing soda beverages in the existing technology is mainly by additionally filling the gas with high pressure into a bottle after the beverage is filled into the container, such that part of the gas is dissolved into the beverage to form a soda beverage. However, the existing method has certain disadvantages listed as follows: firstly, the type of container is limited, which needs to be able to withstand the pressure without deformation due to the method using high-pressure. Therefore, eco-friendly types of soft containers are not suitable. Furthermore, soda beverages filled using the existing technology are not easily preserved, since the high-pressure inflated soda can obtain better solubility only within low-temperature and high-pressure, so that when the container filled with soda is stored for a long time, the foaminess of the soda will not be as good as expected.

SUMMARY OF THE DISCLOSURE

In response to the above-referenced technical inadequacies, the present disclosure provides a beverage product, and system and method for manufacturing the same.

In one aspect, the present disclosure provides a method for manufacturing a beverage product, including: (a) providing a beverage intermediate product including a container and a beverage, wherein the container has an accommodating space which is not occupied by the beverage; (b) filling a beverage foam into the accommodating space; and (c) sealing the container so that the accommodating space is sealed, to obtain the beverage product; wherein the beverage foam includes a foamable liquid and a gas dispersed in the foamable liquid.

In another aspect, the present disclosure provides a system for manufacturing a beverage product, which is used to process a beverage intermediate product into a beverage product. The beverage intermediate product includes a container and a beverage, and the container has an accommodating space which is not occupied by the beverage. The system for manufacturing a beverage product includes: a filling unit being configured to fill a beverage foam into the accommodating space; and a package unit being configured to seal the container for sealing the accommodating space to obtain the beverage product; wherein the beverage foam includes a foamable liquid and a gas dispersed in the foamable liquid.

In another aspect, the present disclosure provides a beverage product, obtained by the method of the present disclosure. In particular, the beverage product includes a closed container, a beverage, and a beverage foam filled in an accommodating space which is not occupied by the beverage. Further, the beverage foam includes a foamable liquid and a gas dispersed in the foamable liquid.

Therefore, the beverage product, and system and method for manufacturing the same of the present disclosure, by the features of "filling a beverage foam into the accommodating space" and "the beverage foam including a foamable liquid and a gas dispersed in the foamable liquid", has the advantage of providing a more efficient and simple way to manufacture the beverage product. In addition to preventing the beverage from contacting the air in the container to extend the storage time, the quality of the beverage can be further enhanced by dissolving gas in the beverage as needed.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
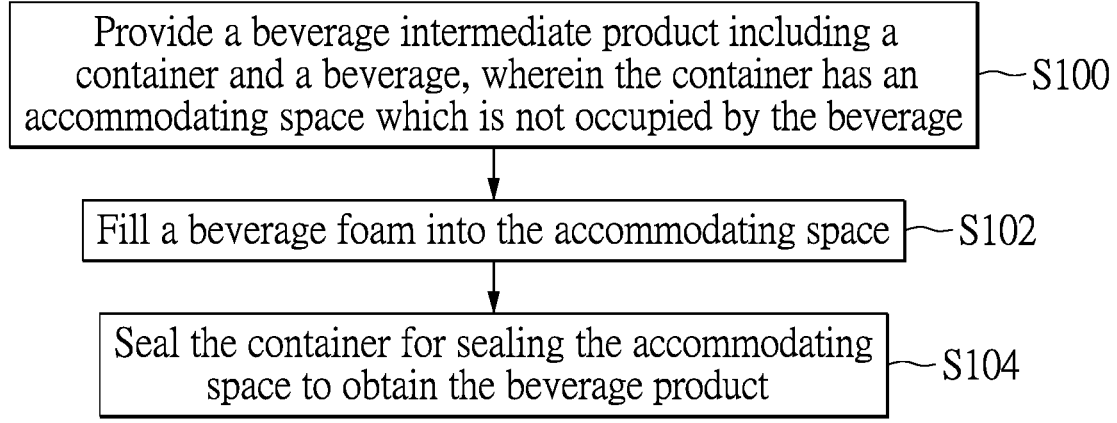
FIG. 1 is a flowchart of a method for manufacturing a beverage product according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Referring to FIG. 1, FIG. 1 is a flowchart of a method for manufacturing a beverage product of the present disclosure. The method for manufacturing a beverage product of the present disclosure includes: providing a beverage intermediate product including a container and a beverage, wherein the container has an accommodating space which is not occupied by the beverage (Step S100); filling a beverage foam into the accommodating space (Step S102); and sealing the container so that the accommodating space is sealed to obtain the beverage product (Step S104).

Generally, the container of the beverage intermediate product provided in step S100 is, for example, an unpackaged container such as a bottle, a glass bottle or a metal can, and more specifically, an aluminum can with a pop tab, a polyester or a polyethylene terephthalate (PET) bottle, and the beverage contained in the container can be a commercially available beverage. More specifically, the beverage is a foamable beverage, which can be a beer, a soda, a functional beverage, a juice, or a dairy product. Further, the beverage can be an unfoamable beverage.

The beverage in step S102 includes a foamable liquid and a gas dispersed in a foamable liquid. More specifically, the gas dispersed in the foamable liquid is at least one selected from the group consisting of carbon dioxide, hydrogen, and nitrogen, that is, the gas may be selected from hydrogen or a mixed gas such as one mixed from hydrogen and any of the above gases. The proportion of the beverage and the gas depends on the space. In general, in case of the aluminum can, the gas is 3~12% of the volume of the beverage, and the ratio can be adjusted as required.

In an embodiment of the present disclosure, the beverage foam is filled in the accommodating space with a predetermined amount, such that the gas of the beverage foam dissolves partially into the beverage. More specifically, the predetermined amount is between 0.6 to 1.1 ppm, which allows a part of the gas of the beverage foam to dissolve into the beverage, so as to provide a more efficient way of producing a beverage product with higher gas content.

More specifically, in step S102, the gas of the beverage foam is hydrogen, the beverage is a foamable beverage such as soda or beer, and the beverage product includes the container, the foamable beverage with dissolved hydrogen in the container, and the beverage foam filled in the accommodating space.

In another embodiment of the present disclosure, in step S102, the beverage foam is filled in the accommodating space with a predetermined amount, such that the accommodating space is completely occupied by the beverage foam. In detail, the existing beverage product still has 3 ml of air after being sealed with a cap, but it can be further reduced to nearly zero by filling in the beverage foam of the present disclosure. In other words, the present disclosure provides an easier way to replace the step of adding extra inert gas, and effectively isolates the beverage product from oxygen.

Figure 2:
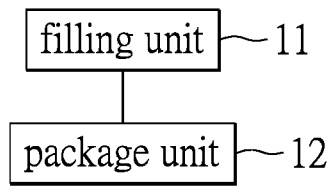
FIG. 2 is a functional block diagram of a system for manufacturing a beverage product according to an embodiment of the present disclosure.

In addition, referring to FIG. 2, the system S for manufacturing the beverage product of the present disclosure includes: a filling unit 11 and a packaging unit 12. The filling unit 11 is used to fill the beverage foam to the accommodating space, and the packaging unit 12 is used to seal the container so that the accommodating space is sealed to obtain the beverage product.

Figure 3:
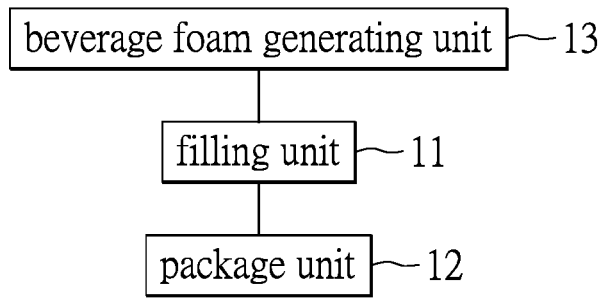
FIG. 3 is a functional block diagram of a system for manufacturing a beverage product according to another embodiment of the present disclosure.
Figure 4:
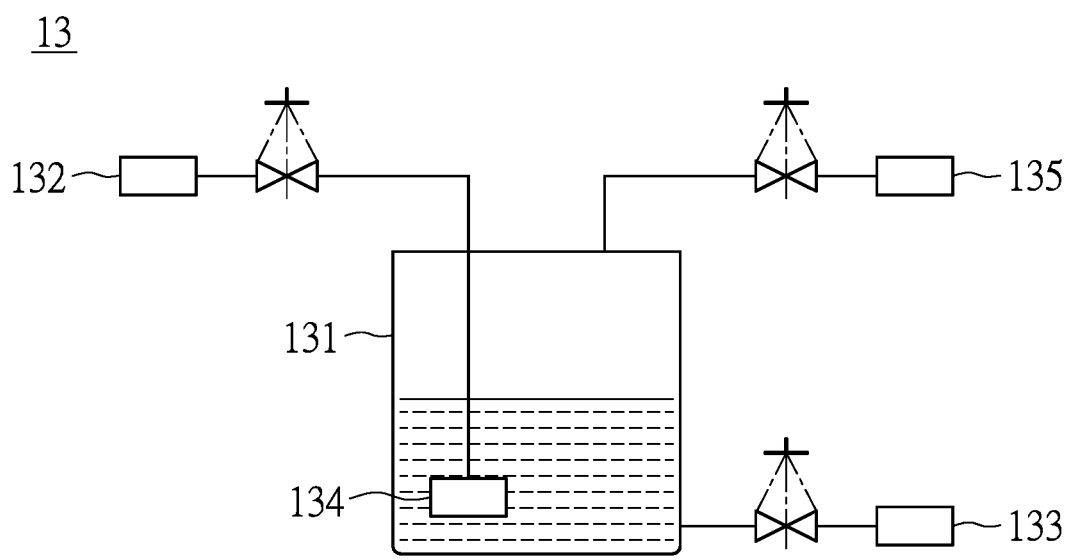
FIG. 4 is a schematic view of a beverage foam generating unit of another embodiment of the present disclosure.

Referring to FIG. 3, the system S for manufacturing the beverage product of the present disclosure, in addition to the filling unit 11 and the packaging unit 12, further includes a beverage foam generating unit 13 coupled to the filling unit 11 for providing a beverage foam. As shown in FIG. 4, the foam generating unit 13 may include a closed container 131, a gas inlet pipe 132, a liquid inlet pipe 133, a foaming element 134, and a foam outlet pipe 135, and each of them respectively has a control valve member. Firstly, the foamable liquid is provided into the closed container 131 through the liquid inlet pipe 133, and leaves the accommodating space in the closed container 131. Then, the gas is input by the gas inlet pipe 132, and the beverage foam is generated by the foaming element 134. Finally, the beverage foam is output via the foam outlet pipe 135, and the foam outlet pipe 135 can be further coupled to the filling unit 11. The gas content of the beverage foam can be controlled by the flow rate of the gas inlet pipe 132, for example, an inlet volume of 1 to 5 liters per minute to produce the beverage foam, wherein the gas pressure in the closed container 131 is 0 to 2 bar. However, the invention is not limited to the examples given above. The above contents are used only for exemplary purposes, and should not be taken as limiting the scope of the present disclosure.

Specifically, the system S for manufacturing the beverage product of the present disclosure is used to process a beverage intermediate product into a beverage product P. The beverage intermediate product includes a container and a beverage, and the container has an accommodating space which is not occupied by the beverage. The beverage foam includes a foamable liquid and a gas dispersed in the foamable liquid, and the foamable liquid has the same or different composition as the beverage. For example, when the beverage is a foamable beverage, the foamable liquid would have the same or different composition as the beverage. When the beverage is an unfoamable beverage, different kinds of liquid can be used, such as sugar water or sparkling water. In addition, addition agents with foaming components, such as a food grade foaming agent, can be used to increase the foaming effect and effectively manufacture the beverage foam. The gas dispersed in the foamable liquid is at least one selected from the group consisting of carbon dioxide, hydrogen, and nitrogen.

The system S for manufacturing the beverage product of the present disclosure can optionally further include a control unit. The control unit is such as a programmable controller, and provided with the capabilities such as timing, counting, calculating, data processing, and communication. Moreover, the system includes a sterilization unit coupled to the filling unit and the packaging unit for sterilizing the container. Furthermore, the system S for manufacturing the beverage product can be set up in a sterilized environment to achieve better sanitary quality.

In addition, an oxidation-reduction potential adjusting device may be included, which is coupled between the beverage foam generating unit and the filling unit. A negative oxidation-reduction potential value is obtained by the oxidation-reduction potential adjusting device to provide a better beverage product quality.

Figure 5:
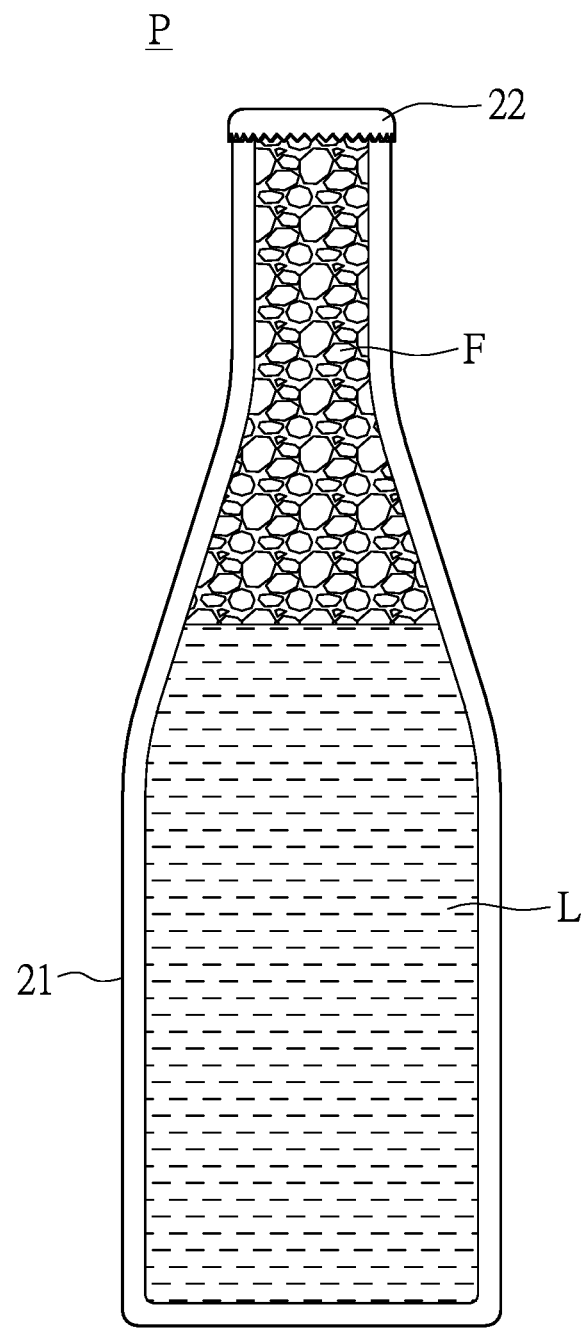
FIG. 5 is a planar schematic view of a beverage product of an embodiment of the present disclosure.

Referring to FIG. 5, a planar schematic view of a beverage product P of an embodiment of the present disclosure is shown. Specifically, the beverage product P includes a container 21 and a package cover 22. The container 21 contains a beverage L and a beverage foam F, the beverage foam F being in the accommodating space which is not occupied by the beverage L. In an embodiment of the present disclosure, the beverage foam F includes a foamable liquid and a gas dispersed in the foamable liquid, and the foamable liquid can have the same composition as the beverage L. In another embodiment of the present disclosure, the beverage foam F includes a foamable liquid and a gas dispersed in the foamable liquid, and the foamable liquid can have a different composition from the beverage L. More specifically, the beverage L includes a foamable beverage and a dissolved gas dissolved in the foamable beverage, and the dissolved gas can have the same composition as the gas dispersed in a foamable liquid of the beverage foam F.

First Embodiment

A beer intermediate product is first provided, which includes a metal aluminum can container and a beer beverage, and the metal aluminum can container has an accommodating space which is not occupied by the beer beverage.

The same beer beverage is then used to generate and fill a hydrogen foam with a predetermined amount by the foam generating unit, the predetermined amount being about 20 mL (accommodating space) of a 330 mL beer and allowing the hydrogen of the beverage foam to partially dissolve into the beer beverage, such that it obtains the beverage product.

The oxidation-reduction potential (ORP) of the original beer is about +50 mV, and the ORP of the resulting hydrogenated beer beverage is less than −450 mV. Due to the reduction of the air retention by the foaming technique, the aluminum can container alleviates the problem of the taste being affected by the oxidation of the container.

Next, the container is packaged to obtain a beer beverage product of the first embodiment.

Second Embodiment

A juice intermediate product is first provided, which includes a polypropylene plastic container and a juice beverage, and the polypropylene plastic container has an accommodating space which is not occupied by the beverage.

A sugar water is then used to generate a sugar water foam by the foam generating unit, and fill the sugar water foam into the accommodating space with a predetermined amount, the volume of the predetermined amount being equal to the volume of the accommodating space, such that the accommodating space which is not occupied by the beverage is filled by the sugar water foam and isolates the juice beverage from the air, preventing the juice beverage from oxidation.

Next, the container is packaged to obtain a juice beverage product of the second embodiment.

In conclusion, the effectiveness of the beverage product, and system and method for manufacturing the same is that the present disclosure including the technical features of "filling a beverage foam into an accommodating space" and "the beverage foam includes a foamable liquid and a gas dispersed in the foamable liquid" provides an effective and convenient method for manufacturing beverage product for avoiding the beverage in the container from contacting with air and oxidizing, thereby ensuring longer shelf-life. In addition, the gas can be dissolved into the beverage from the beverage foam, which improves the taste of the beverage.

Moreover, the present disclosure further includes the technical features of "the beverage foam is filled in the accommodating space with a predetermined amount, such that the gas of the beverage foam partially dissolve into the beverage", and "the beverage foam is filled in the accommodating space with a predetermined amount, such that the accommodating space is completely occupied by the beverage foam," which effectively improves the convenience of the manufacturing method without having to use pressurized equipment or being limited by the pressure resistance of the container, and without having to add inert gas or using the vacuuming method, preventing the beverage L from oxidation or bacterial contamination by air. The present disclosure provides a more efficient and simple system and method for manufacturing the beverage product, further obtaining a beverage product improved with longer shelf life and better quality.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for manufacturing a beverage product, comprising:
   (a) providing a beverage intermediate product including a container and a beverage, wherein the container has an accommodating space which is not occupied by the beverage;
   (b) filling a predetermined amount of a beverage foam consisting of a foamable liquid and hydrogen gas dispersed in the foamable liquid into the accommodating space to allow the hydrogen gas to be partially dissolved into the beverage; and
   (c) sealing the container so that the accommodating space is sealed to obtain the beverage product;
   wherein the hydrogen gas in the predetermined amount is between 0.6 and 1.1 ppm.

2. The method for manufacturing a beverage product according to claim 1, wherein the beverage is a foamable beverage and the foamable beverage has the same composition as the foamable liquid.

3. The method for manufacturing a beverage product according to claim 1, in the step (b), the beverage foam is filled in the accommodating space, such that the accommodating space is completely occupied by the beverage foam.

4. The method for manufacturing a beverage product according to claim 1, the beverage is selected from the group consisting of beer, functional beverage, juice and dairy products.

5. A beverage product, obtained by the method according to claim 1.

\* \* \* \* \*